(12) United States Patent
Burugula et al.

(10) Patent No.: US 8,850,410 B2
(45) Date of Patent: Sep. 30, 2014

(54) SYSTEM USING A UNIQUE MARKER WITH EACH SOFTWARE CODE-BLOCK

(75) Inventors: Ramanjaneya S. Burugula, Yorktown Heights, NY (US); Joefon Jann, Ossining, NY (US); Pratap C. Pattnaik, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1250 days.

(21) Appl. No.: 12/696,879

(22) Filed: Jan. 29, 2010

(65) Prior Publication Data

US 2011/0191754 A1   Aug. 4, 2011

(51) Int. Cl.
*G06F 9/45* (2006.01)
*G06F 9/44* (2006.01)
*G06F 9/30* (2006.01)
*G06F 9/00* (2006.01)

(52) U.S. Cl.
CPC ....................................... *G06F 9/00* (2013.01)
USPC ........... 717/139; 717/136; 717/137; 717/138; 717/140; 717/141; 717/142; 717/143; 717/144; 717/145; 717/146; 717/147; 717/148; 717/149; 717/150; 717/151; 717/152; 717/153; 717/154; 717/155; 717/156; 717/157; 717/158; 717/159; 717/160; 717/161; 717/114; 717/115; 717/116; 717/117; 717/118; 717/119; 712/208; 712/209; 712/210; 712/211; 712/212; 712/213

(58) Field of Classification Search
CPC ......................................................... G06F 9/00
See application file for complete search history.

(56) References Cited

U.S. PATENT DOCUMENTS

| | | | | |
|---|---|---|---|---|
| 5,240,544 A | * | 8/1993 | Tanimoto et al. | 156/331.6 |
| 5,513,279 A | * | 4/1996 | Yoshinari et al. | 382/232 |
| 5,678,028 A | * | 10/1997 | Bershteyn et al. | 703/22 |
| 6,816,616 B2 | * | 11/2004 | Teng | 382/232 |
| 6,873,934 B1 | * | 3/2005 | Rodrigues et al. | 702/186 |
| 6,993,664 B2 | * | 1/2006 | Padole et al. | 705/59 |
| 7,075,553 B2 | * | 7/2006 | Miller et al. | 345/598 |
| 7,080,318 B2 | * | 7/2006 | Devillers | 715/234 |
| 7,197,671 B2 | * | 3/2007 | Swaine et al. | 714/45 |
| 7,240,236 B2 | * | 7/2007 | Cutts et al. | 714/6.1 |
| 7,313,705 B2 | * | 12/2007 | Turkboylari | 713/193 |
| 7,362,860 B2 | * | 4/2008 | Hayashi | 380/210 |
| 7,395,454 B1 | * | 7/2008 | Wohlgemuth et al. | 714/30 |
| 7,603,664 B2 | * | 10/2009 | Dutt et al. | 717/153 |
| 7,707,394 B2 | * | 4/2010 | Ashfield et al. | 712/227 |
| 7,958,497 B1 | * | 6/2011 | Lindo et al. | 717/128 |

(Continued)

OTHER PUBLICATIONS

Yan-et al., "Improving Cost, Performance, and Security of Memory Encryption and Authentication"; ACM/IEEE; 2006.

(Continued)

*Primary Examiner* — Henry Tsai
*Assistant Examiner* — Jing-Yih Shyu
(74) *Attorney, Agent, or Firm* — Ido Tuchman; Jennifer R. Davis (57) ABSTRACT

A system and method for improving software maintainability, performance, and/or security by associating a unique marker to each software code-block; the system comprising of a plurality of processors, a plurality of code-blocks, and a marker associated with each code-block. The system may also include a special hardware register (code-block marker hardware register) in each processor for identifying the markers of the code-blocks executed by the processor, without changing any of the plurality of code-blocks.

23 Claims, 6 Drawing Sheets

(56) References Cited

U.S. PATENT DOCUMENTS

| | | | | |
|---|---|---|---|---|
| 8,108,543 | B2* | 1/2012 | Hansen | 709/232 |
| 8,266,604 | B2* | 9/2012 | Groff et al. | 717/146 |
| 2002/0147916 | A1* | 10/2002 | Strongin et al. | 713/193 |
| 2002/0166062 | A1* | 11/2002 | Helbig, Sr. | 713/200 |
| 2003/0002742 | A1* | 1/2003 | Sano et al. | 382/239 |
| 2004/0215720 | A1* | 10/2004 | Alexander et al. | 709/204 |
| 2008/0263366 | A1* | 10/2008 | G | 713/190 |
| 2009/0080647 | A1* | 3/2009 | Mantin et al. | 380/29 |
| 2009/0133033 | A1* | 5/2009 | Lindo et al. | 718/108 |
| 2010/0235819 | A1* | 9/2010 | Rose | 717/139 |

OTHER PUBLICATIONS

Harris-et al.; "Optimizing Memory Transactions"; ACM Digital Library: pp. 14-24; Jun. 10-16, 2006.

Grangetto-et al.; "Multimedia Selective Encryption by Means of Randomized Arithmetic Coding"; INSPEC/IEEE; Oct. 2006.

* cited by examiner

FIG. 1

FIG. 2 – How Application Software is generated

FIG. 3 -- Code-block Marker Hardware Register

FIG. 4 – Layout of the CMR (Code-block Marker hardware Register)

FIG. 5 – Application Software Generation Process

FIG. 6 – Method to identify code-block marker changes & notify monitoring threads.

SYSTEM USING A UNIQUE MARKER WITH EACH SOFTWARE CODE-BLOCK

BACKGROUND

1. Field of the Invention

The invention relates to the field of computer systems, and, more particularly, to improving system software of a computer system.

2. Description of Background

Generally, software applications today are composed of multiple components, each with different attributes, packaged together as a single application and often executed in a single thread in the runtime environment. As a result, a single application program contains several code-blocks, each with different characteristics, e.g. Performance, Reliability, Availability, and Serviceability (RAS), security, and/or the like.

Some code-blocks may be central processing unit (CPU) intensive, some may be input/output (I/O) intensive, and some may contain critical code that should be called only from within the same application. In most cases, the CPU, computer processor, processor, and/or the like, is not aware of the characteristics of the code-blocks it is executing; it merely executes the instructions from the instruction stream.

SUMMARY

According to one embodiment, a system to improve maintainability, performance, and security of software applications may include a processor, a plurality of code-blocks, and a marker carried by each of the plurality of code-blocks. The system may also include a compiler and/or an interpreter which translates the source code written in any of the programming languages such as C, C++, Java, Perl, PHP, Python, etc. into instructions that can be executed by the processor. During this translation process, the compiler and/or interpreter may determine the marker that needs to be associated with each of the code-blocks. The system may also include a loader which loads the compiled programs into the memory of the operating system ("OS"). During this loading process, the loader may detect markers assigned to each of the code-blocks used by the compiler/interpreter and convert them into markers that are specific to the current OS instance and the hardware on which the OS is running, thereby improving security, maintainability, and/or performance of the plurality of code-blocks executed by the processor, without changing any of the plurality of code-blocks. The loader may also coalesce code-blocks with the same marker so that they are put into a contiguous memory region.

The compiler and/or interpreter may determine the number of markers to use and the values of the markers in several ways, for example:
- based on some hints within the source code,
- based on static analysis of the source code,
- based on the dynamic analysis of executed code-blocks, or
- based on the organization of the source code into separate files/functions.

The compiler and/or interpreter may determine the granularity of a code-block with which to associate a marker to be an individual source/object file, or a class within a source/object files, and/or a function within a source/object file. The loader may associate each marker with one or more page-frames of the object code. Each marker may be associated based upon desired performance of each of the plurality of code-blocks.

The plurality of code-blocks may include an instruction set to be executed on the processor. Each of the plurality of code-blocks may include at least one of a plurality of characteristics that define how that code-block should be executed and what should be done before, during, and after the execution of the code-block.

The processor may use each of the markers to differentiate each of the plurality of code-blocks and/or track control transfers between any pair of the plurality of code-blocks. The processor may notify the OS, which in turn may notify any interested party when a thread enters or leaves one of the plurality of code-blocks with a specific marker, and/or when there is a marker change in an instruction stream.

The method may also include making the association of each marker with a code-block, based either on the desired performance, or the desired energy utilization, or some combination of the two.

Another aspect of the invention is a computer program product that may improve the security, maintainability, and/or performance of software applications. The computer program product may include a computer readable storage medium having computer readable program code embodied therewith, the computer readable program code comprising computer readable program code that may be configured to provide a marker to each of a plurality of code-blocks. The computer readable program code may also be configured to determine each of the markers, via a compiler or interpreter, to improve security, maintainability, and/or performance of the plurality of code-blocks executed by a processor without changing any of the plurality of code-blocks.

The computer program product may also include computer readable program code configured to associate each of the markers with an object file of the program code, each function within a respective object file, or each class within a respective object file. The computer program product may further include computer readable program code configured to assign at least one of a plurality of characteristics to each of the plurality of code-blocks that defines what the processor does before, during, and after the execution of each of the plurality of code-blocks.

The computer program product may include computer readable program code configured to use each of the markers via the compiler, interpreter, and/or loader to differentiate between each of the plurality of code-blocks and/or track control transfers between any of the plurality of code-blocks. The computer program product may further include computer readable program code configured to notify, via the OS, any interested party when a thread enters or leaves one of the plurality of code-blocks with a respective marker, and/or when there is a respective marker change in an instruction stream.

Another aspect of the invention is another embodiment of a system that may improve the security, maintainability, and/or performance of application software. The system may include a processor, and a plurality of code-blocks that may include an instruction set to be executed on the processor. The system may also include a marker carried by each of the plurality of code-blocks. The system may further include a compiler and/or interpreter configured to execute on the processor, where the compiler and/or interpreter may identify each of the markers, thereby improving the security, maintainability, and/or performance of the plurality of code-blocks executed by the processor without changing any of the plurality of code-blocks.

DETAILED DESCRIPTION

The invention will now be described more fully hereinafter with reference to the accompanying drawings, in which preferred embodiments of the invention are shown. Like numbers refer to like elements throughout, like numbers with letter suffixes are used to identify similar parts in a single embodiment, letter suffix lower case n is a variable that indicates an unlimited number of similar elements, and letter suffix lower case i is a variable that indicates any single element among a variable number of similar elements.

Figure 1:
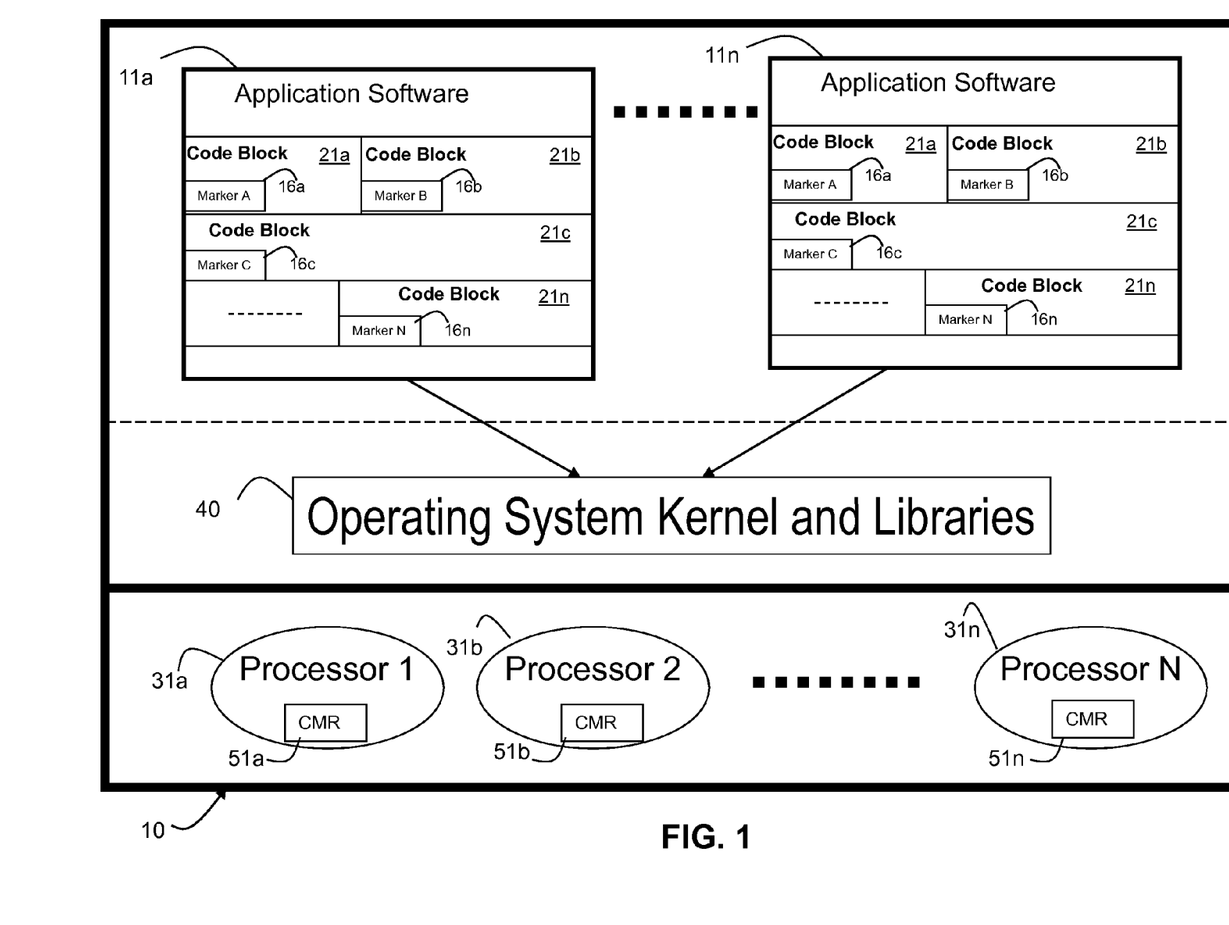
FIG. 1 is a schematic block diagram of a system to improve software Maintainability, Performance and Security in accordance with the invention.

With reference now to FIG. 1, a system 10 to improve software maintainability, performance and security is initially described. The system 10 is a programmable apparatus that stores and manipulates data according to an instruction set as will be appreciated by those skilled in the art.

According to one embodiment of the invention, the system 10 includes one or more processors 31a, 31b, ... 31n, a plurality of Application Software programs 11a ... 11n, with each Application Software programs containing a plurality of code-blocks 21a-21n, and a marker 16a-16n carried by each of the plurality of code-blocks. In one embodiment, the processor 31i is a circuit that executes computer system instructions carried by the plurality of code-blocks 21a-21n. In another embodiment, the marker(s) 16a-16n are markers, tags, and/or the like.

In one embodiment, the system 10 also includes an operating system 40 configured to execute on the processors 31a-31n, with the operating system containing programs to identify each of the markers 16a-16n to thereby improve security, maintainability, and/or performance of the plurality of Application Software 11a-11n executed by the processor without changing any of the plurality of code-blocks.

In one embodiment, each of the plurality of the processors 31a-31n has a special purpose register called Code-block Marker Register (CMR) 51a-51n. Each of the CMRs 51a-51n in the processors 31a-31n respectively contain information about which code-block marker transitions in the instruction stream should cause the processor to notify the operating system. In another embodiment, the operating system 40 notifies any interested party when a thread enters or leaves one of the plurality of code-blocks 21a-21n with a respective marker 16a-16n and/or there is a respective marker change in an instruction stream.

Figure 2:
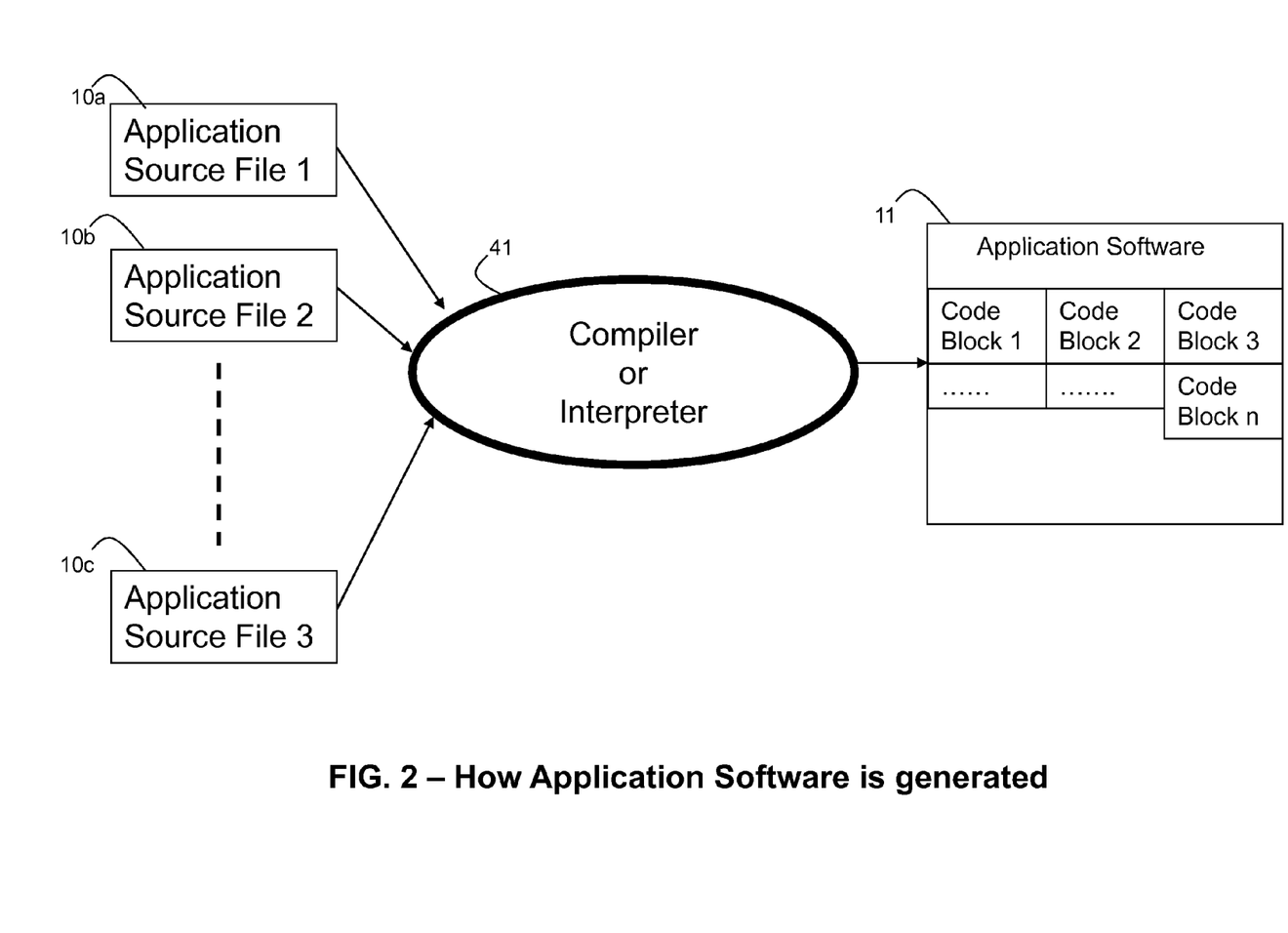
FIG. 2 is a schematic diagram showing how application software is generated.

In one embodiment, each of the application software programs 11a-11n may be generated by a compiler and/or an interpreter hereinafter referred to as compiler/interpreter 41 (see FIG. 2). In the process of generating the application software 11a-11n, the compiler/interpreter 41 will identify the set of code-blocks 21a-21n that will be contained in the application software, and the marker 16a-16n needed by each of those code-blocks. The compiler/interpreter 41 then tags each of the code-blocks 21a-21n with its corresponding marker 16a-16n. In one embodiment, each of the markers 16a-16n are associated with the code-blocks 21a-21n based upon the desired performance of that code-block and/or the desired security level of that code-block.

In one embodiment, each of the markers 16a-16n is associated with a respective object file, or each function within a respective object file, or the set of functions belonging to a class. In another embodiment, at the hardware level, each of the markers 16a-16n are associated with a memory page-frame (or a set of memory page-frames) into which the object code-blocks 21a-21n are placed. The processor 31i identifies the markers 16a-16n based on the memory addresses from which it retrieves the instructions. The operating system kernel 40, which loads the application software programs 11a-11n into memory, is responsible for ensuring that code-blocks 21a-21n with different markers 16a-16n are loaded into different memory page-frames.

In one embodiment, the plurality of code-blocks 21a-21n include an instruction set to be executed on the processor 31i. In another embodiment, each of the plurality of code-blocks 21a-21n include at least one of a plurality of characteristics that define how the processor 31i uses each of the plurality of code-blocks.

Another aspect of the invention is a method to identify the code-blocks 21a-21n while generating the application software program 11a-11n. A schematic diagram of the components involved in this method is depicted in FIG. 2. Now referring to FIG. 2, a method of generating the application software programs 11a-11n is depicted. The Application Software program 11a-11n is generated from the application source files 10a-10n by the compiler/interpreter 41, for example. In this process a novel aspect of the invention is a method to identify the code-blocks 21a-21n either at the function level or at class level, or at the object file level, and determine the set of markers 16a-16n needed by the application software 11a-11n based on the characteristics of the code-blocks. This method is described in more details in FIG. 5. The output of this method is the application software program 11a-11n that consists of plurality of code-blocks 21a-21n each with a specific marker 16a-16n.

Figure 3:
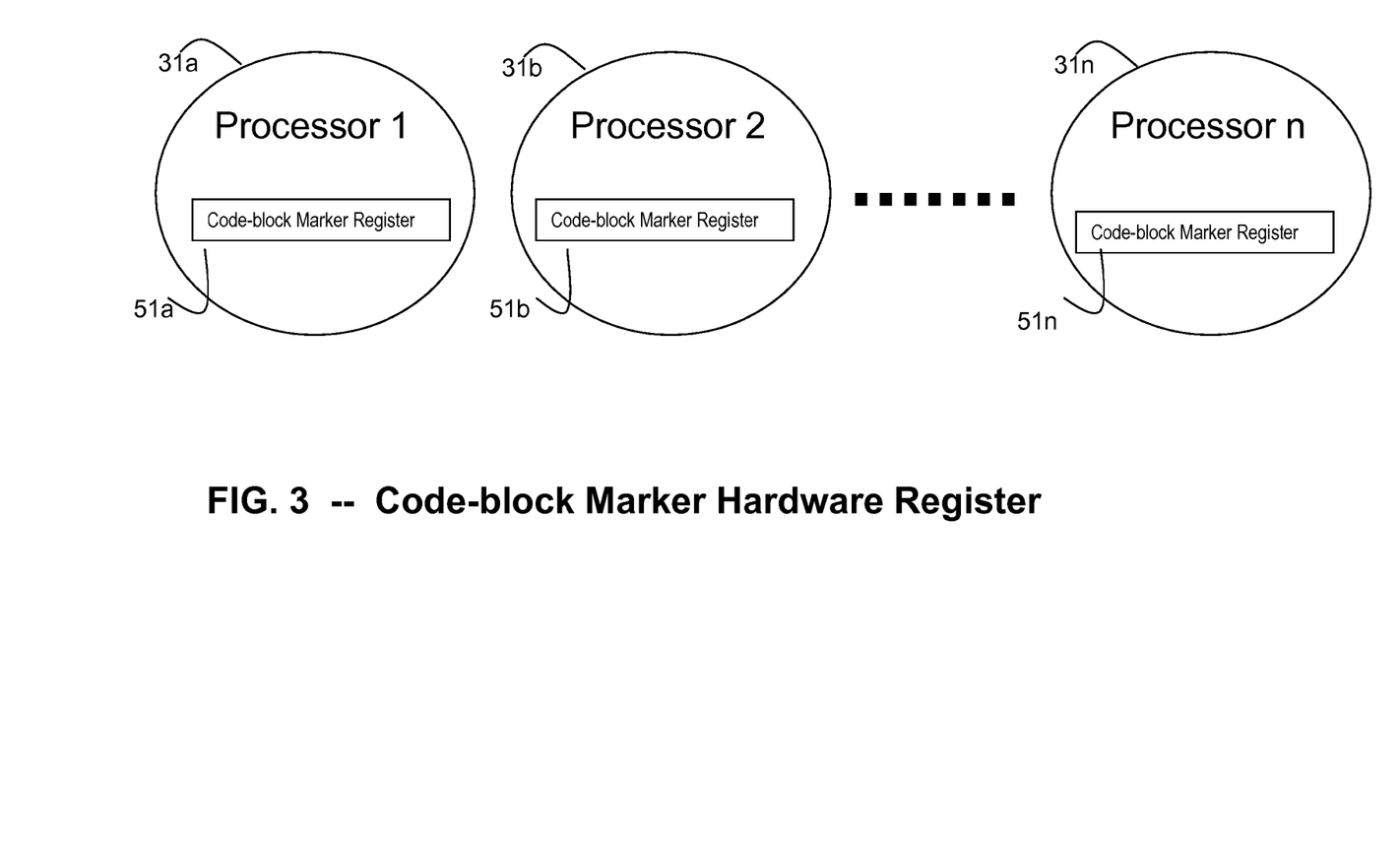
FIG. 3 depicts a specific hardware register that is part of the invention.

Another aspect of this invention is a register called a code-block marker register 51a-51n in each processor 31a-31n or core. A schematic diagram of this aspect of the invention is depicted in FIG. 3. Each processor 31a-31n that executes instructions in a code-block 21a-21n has a register called a Code-block Marker Register (CMR) 51a-51n that specifies when that processor should notify the operating system 40. The CMR 51a-51n helps the processor 31a-31n in identifying whether to notify the operating system 40 or not whenever there is a change in the code-block marker 16a-16n.

Figure 4:
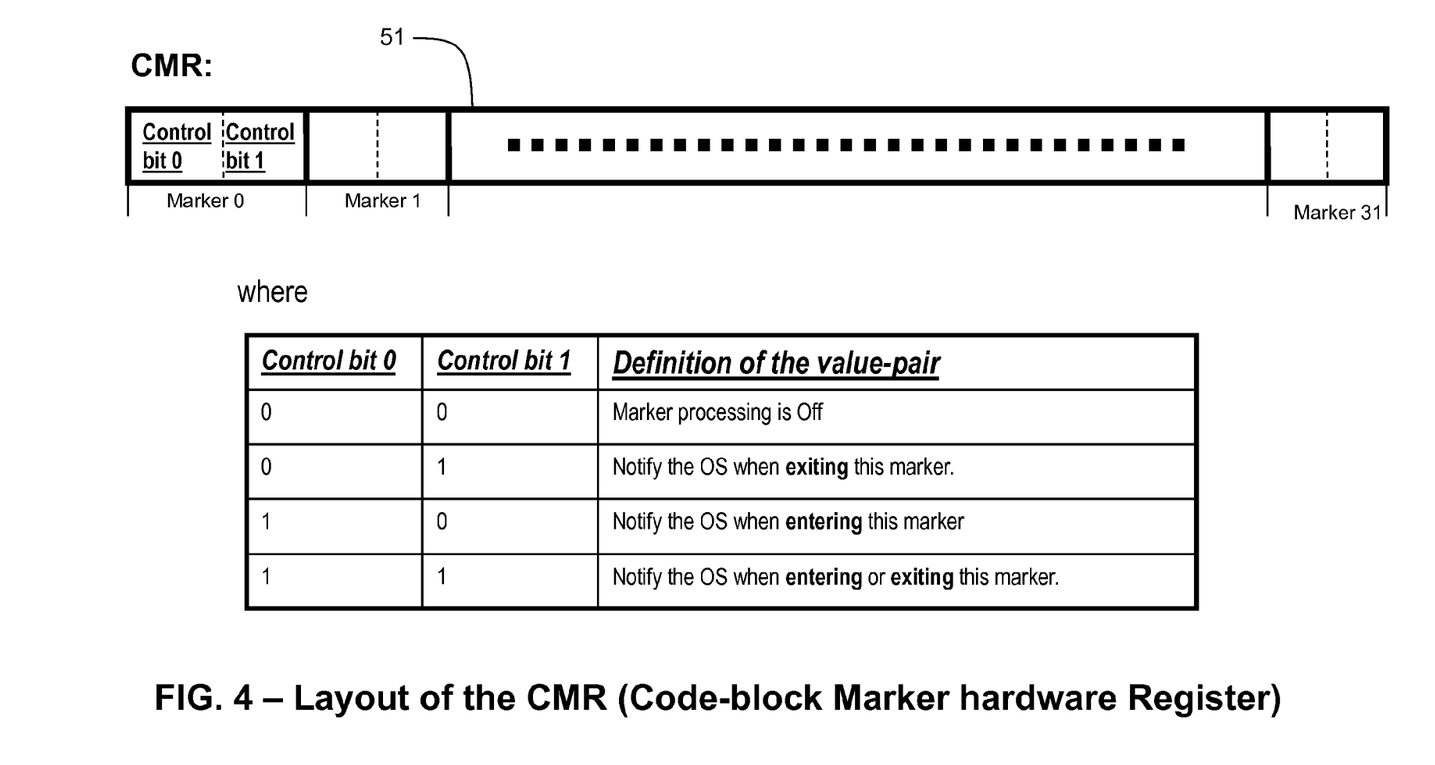
FIG. 4 shows the layout of the hardware register depicted in FIG. 3.

Referring now to FIG. 4, this figure describes the layout of the Code-block Marker Register 51a-51n depicted in FIG. 3, for example. In this figure, the system 10 is depicted with a 64-bit register layout, but those skilled in the art can understand that a similar layout can be implemented even if the register size is not 64 bits. In this embodiment, the CMR 51a-51n of a processor 31a-31n is a sequence of 32 2-bit values each 2-bit value representing the control bits for one marker 16a-16n. Each marker's 16a-16n control bits specify whether that processor 31a-31n should notify the operating system 40 when entering to or exiting from the corresponding code-block 21a-21n. If control bit 0 of marker N is set to 1, it implies that the processor 31a-31n should notify the OS 40 whenever the current instruction's code-block 21a-21n marker 16a-16n is N and the next instruction's code-block marker is not N. If the control bit 1 of the marker N is set to 1, it implies that the processor 31a-31n should notify the OS 40 whenever the current instruction's code-block 21a-21n marker is not N and the next instruction's code-block marker is N. For both the control bits, a value of 0 implies that the processor 31*a*-31*n* should not notify the OS 40 in respective cases. The detailed descriptions of the method associated with this schematic diagram are shown in a flow chart in FIG. 6.

Figure 5:
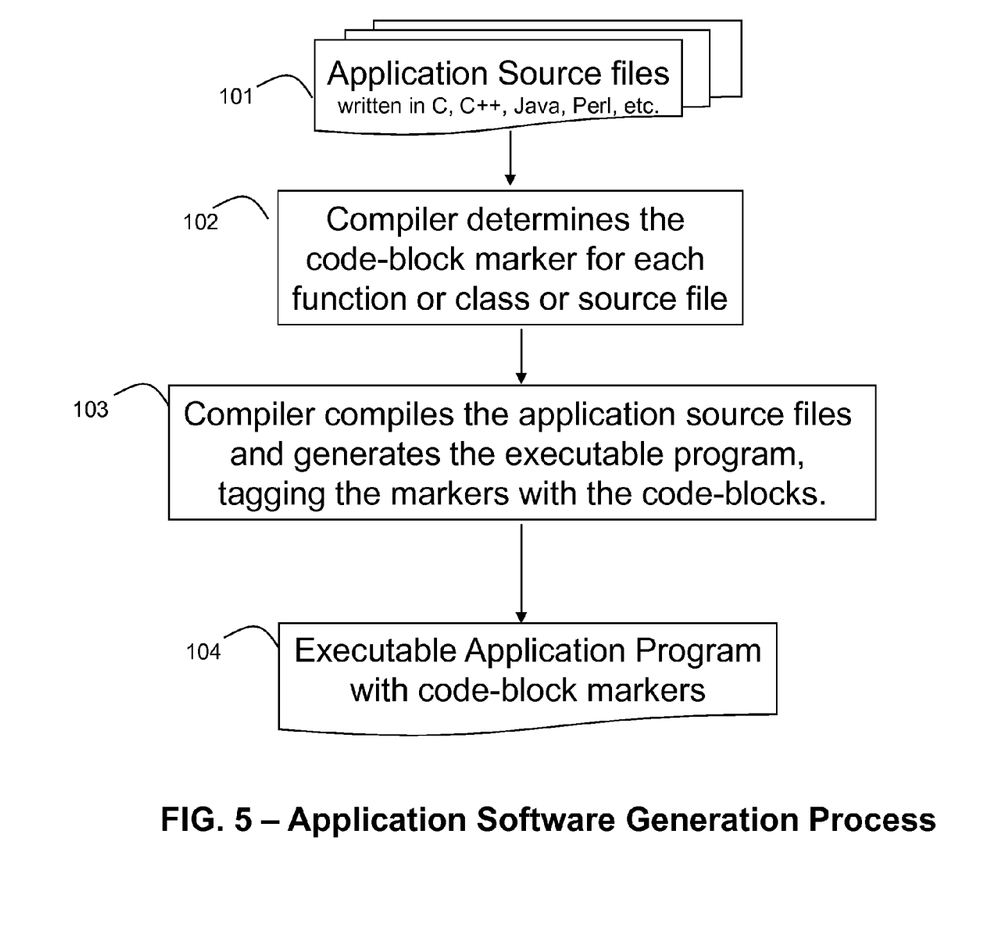
FIG. 5 is a flowchart illustrating application software generation process.

In another method embodiment, which is now described with reference to the flowchart in FIG. 5, the application source files which may be written in any programming language such as C, C++, Java, Perl, etc. are converted into an executable program by the compiler/interpreter 41. The application source files in block 101 are provided as input to the compiler/interpreter 41. In step 102, the compiler/interpreter 41 identifies the distinct code-blocks 21*a*-21*n* in the application source files and determines the code-block markers 16*a*-16*n* to associate with those code-blocks. The method may additionally include identifying distinct code-blocks 21*a*-21*n* at the granularity of an source file, each function within a respective source file, and/or each class in the respective source file. Then in step 103, the compiler 41 generates the executable application program by compiling the individual source files tagging the code-block markers 16*a*-16*n* with the code-blocks during that process. The output of this method, Executable Application program with code-block markers 16*a*-16*n*, is shown in block 104.

Figure 6:
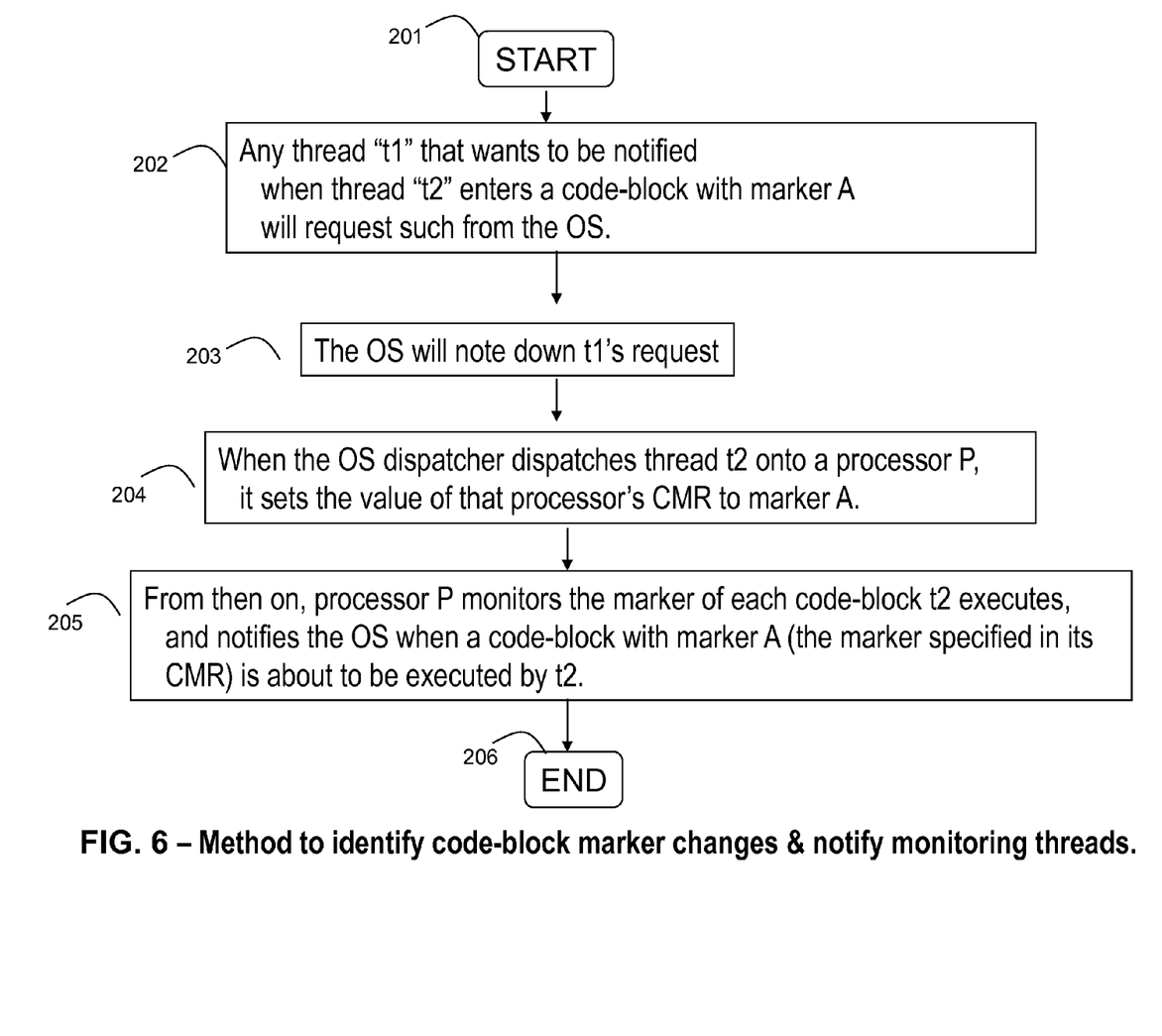
FIG. 6 is a flowchart illustrating method aspects to identify the code-block marker changes and notify monitoring threads.

In another method embodiment, which is now described with reference to the flowchart in FIG. 6, any thread can register its interest in getting notification from the OS whenever an application enters or leaves a code-block. The method starts in block 201. In step 202, any thread t1 that wants to be notified when an application enters or leaves a code-block will request such from the OS. The thread t1 first identifies the thread(s) t2 belonging to the application it wants to monitor and the markers it wants to monitor in that application. It then issues a OS system call to register its interest to be notified whenever the thread t2 enters or leaves the code-blocks with the specified markers. In step 203, the OS, upon receiving t1's request, will set the thread t2's CMR value accordingly. Note that this method can be easily expanded to support multiple threads requesting the OS to be notified instead of a single thread t1. In step 204, when the OS dispatcher dispatches t2 onto a processor, it sets that processor's CMR register to t2's trigger CMR value. In step 205, the processor will monitor t2's instruction code-block markers from then on. Based on the stored trigger CMR value, the processor will notify the OS when the marker of the next instruction to be executed by t2 matches the target marker stored in its CMR. The OS will in turn notify all the threads that have requested to receive notification.

Another aspect of the invention is a computer program product to improve system software. In one embodiment, the computer program product includes a computer readable storage medium having computer readable program code embodied therewith, the computer readable program code comprising computer readable program code configured to provide a marker 16*a*-16*n* to each of a plurality of code-blocks 21*a*-21*n*. In another embodiment, the computer readable program code is configured to identifying each of the markers 16*a*-16*n*, via a processor 31*i*, to thereby improve security, maintainability, and/or performance of the plurality of code-blocks 21*a*-21*n* executed by a processor 31*i* without changing any of the plurality of code-blocks.

In one embodiment, the computer program product includes computer readable program code configured to associate each of the markers 16*a*-16*n* with a respective object file, each function within a respective object file, and/or each class within a respective objective file. In another embodiment, the computer program product includes computer readable program code configured to assign at least one of a plurality of characteristics to each of the plurality of code-blocks 21*a*-21*n* that define what the processor 31*i* does before, during, and after executing each of the plurality of code-blocks.

In one embodiment, the computer program product includes computer readable program code configured to use each of the markers 16*a*-16*n* via the processor 31*i* to differentiate between each of the plurality of code-blocks 21*a*-21*n* and/or track control transfers between any of the plurality of code-blocks. In another embodiment, the computer program product includes computer readable program code configured to notify, via the operating system 40, any interested party when a thread enters or leaves one of the plurality of code-blocks 21*a*-21*n* with a respective marker and/or there is a respective marker change in an instruction stream.

In view of the foregoing, the system 10 addresses improving system software, for example. In contrast, the processor in any current system does not know anything about the currently running application beyond the instruction being executed. For example, beyond the instruction syntax, the processor does not know which function or application those instructions belong to and the semantics associated with those functions or applications.

For instance, when the operating system ("OS") sends a signal to stop or terminate an application running in a containerized environment such as Enterprise Java Beans ("EJB"), the application container is expected to handle the signal. However, the application container does not have enough information about the current code-block being executed in the application, to take appropriate cleanup action before terminating the application.

For example, when a Java application thread receives a SIGSTOP signal, the WebSphere container does not know which function/class that thread is currently executing. As a result the JVM does not know what cleanup activities to take before terminating the Java application thread.

In addition, the fact that a software application cannot know which code-block its thread is currently executing also creates problems for the software maintenance. Often times, the software needs to be patched dynamically while the old version of the software is still running. Currently under these circumstances, the old version of the software is left in the memory while the branches are updated to the new version. For instance, all the new invocations of the functions in the updated software will go to the new software, while some of the old invocations may still be inside the functions in the old version of the software. The reason for keeping the old version of the software is that the updating/installation program has no idea if there is some thread that is still in one of the functions provided by the old software. If the installation program removes the old function from the memory and then there might be a thread that wakes up after the removal of the old function and it does not have any instruction to execute.

Further, software security is currently implemented by using user ids and/or roles. In both these mechanisms, the application thread acquires the given role or user id at a certain point in time either explicitly or implicitly and runs under that role or user id for the life of that thread. This mechanism does not allow differentiating between 2 separate executions of the same function: (i) the function being called from a known interface within the same application or library, and (ii) the function being called from an unknown interface. This lack of differentiation poses security vulnerabilities in the software because a third party library may invoke the un-exported internal functions.

In one embodiment, the system 10 provides a mechanism, to associate a marker 16a-16n with each code execution block 21a-21n, and to use this marker for enhancing security, maintainability and performance in a computer system. In another embodiment, the compiler and/or interpreter associates a marker 16a-16n with each code-block 21a-21n at some granularity of the code-blocks depending on the tradeoff between the costs of memory/performance overhead and benefits of additional security/maintainability. For example, system 10 maintains a unique marker 16a-16n for each object file, or each function within an object file, or each class within an object file.

In one embodiment, the processor 31i identifies the code-block marker 16a-16n of an instruction that the processor is executing at any given point in time. In another embodiment, the processor 31i notifies, via the operating system 40, any interested party when a thread enters or leaves a code-block 21a-21n with the specified code-block marker 16a-16n, or when there is a change of code-block marker in the instruction stream.

As described before, present concurrent software updating has to leave the old code in memory because the installation program cannot determine if a thread is currently inside a code-block being patched. In contrast, in one embodiment, system 10 knows which code-block a thread is executing at any given point time. For instance, if the code-block 21a-21n that is being patched is not run by any thread in the software application, then the update manager can safely remove the old code. Even if a thread is currently executing the code-block 21a-21n being patched, the update manager can ask the OS to notify it when the thread leaves that code-block so that it can remove the old code at that time, for example.

In one embodiment, the system 10 restricts the execution of the software and enables its auditability. In another embodiment, by separating the software application into multiple code-blocks 21a-21n and using system 10 to get notified whenever control transfers from one code-block to another, the system 10 can enhance the software security by restricting the execution of code. In another embodiment, system 10 can also enhance the auditability by logging an event whenever a certain code-block 21a-21n is executed.

In one embodiment, the system 10 enables heterogeneous processor behavior based on the workload as identified by the page marker 16a-16n. In another embodiment, by separating the software application into multiple code-blocks 21a-21n based on the processor 31i configuration it requires, and setting a different marker for each code-block, system 10 can schedule different code-blocks onto different processor/cores even though all those code-blocks are executed under a single software thread.

In one example embodiment, system 10 stores a marker 16a-16n associated with each page-frame of the application program text. In another embodiment, the compiler/interpreter 41 identifies the different blocks of the code 21a-21n and the number of unique markers 16a-16n required for the application program.

In one embodiment, the characteristics of each section of the code 21a-21n can be either specified by the programmer or automatically determined by the compiler/interpreter 41. Examples of characteristics of the code-blocks 21a-21n are performance, security, and serviceability. In another embodiment, at the preceding stage, the "tagging" of the code 21a-21n is done at the level of individual object files or even at the level individual functions or classes.

In one embodiment, the mechanism of what kind of different characteristics to look for in the code-blocks 21a-21n depends on the architecture specifications of the processor 31i. For example, some processors 31a-31n may have the capability to dynamically change the processor core mode from hardware-multi-thread mode to hardware-single-thread mode. When the core is running in hardware-single-thread mode, the user thread executing on that core will have exclusive access to all the resources (e.g. cache memory) in that core; however, only one user thread can execute on that core at any given point in time. When the core is running in hardware-multi-thread mode, the OS 40 can execute more than one user thread simultaneously on a single core, but all the user threads will share the resources on the core. From the overall system 10 utilization point of view, it is advantageous to run the cores in hardware-multi-thread mode. However, if a specific application 11a-11n code can make use of the additional resources available in hardware-single-thread mode, it is better to run that part of the application code on the core in single-thread mode. An application 11a-11n may consist of some code-blocks 21a-21n that can make use of the additional resources in hardware-single-thread mode, and some other code-blocks that cannot make use of the additional resources. The compiler 41, when it is generating an executable program to run on a processor 31a-31n with the above said capability, can identify the code-blocks 21a-21n with these two different performance characteristics and tag them with different marker 16a-16n values. The operating system 40 will then dispatch the application 11a-11n thread to an appropriate core at different points of the application, depending on the marker 16a-16n value of the code-blocks 21a-21n.

In one embodiment, the compiler/interpreter 41 will relocate the code-blocks 21a-21n such that code-blocks with similar markers 16a-16n or co-located. In another embodiment, the loader in the operating system 40 ensures that no two code-blocks with different markers will be put in the same page-frame.

In one embodiment, when the OS pages-in each page of the application text into memory, the system 10 sets the marker 16a-16n for the page-frame where the application text is loaded into. In another embodiment, this marker 16a-16n is associated with the page-frame as long as the specific application text stays in that page-frame.

In one embodiment, when an instruction fetch operation occurs, the processor 31i will find out the page marker 16a-16n associated with the code-block 21a-21n containing that instruction. In another embodiment, if the address of the instruction fetched belongs to a different page-frame and the marker 16a-16n of that page-frame is different from that of the currently executing instruction's page marker, then the processor 31i will generate an interrupt. In another embodiment, this interrupt is handled by the OS, but can percolate all the way to the application if necessary.

In one embodiment, the interrupt handler can take different actions based on the old and new markers and the characteristics inferred from those markers 16a-16n. In another embodiment, if the change in the marker 16a-16n requires putting the processor 31i into a new mode, e.g. single-thread mode, then the OS will set the processor-mode accordingly.

In one embodiment, if the change in the marker 16a-16n requires stopping the code 21a-21n from being run, then an invalid operation signal is sent to the application and the current thread is pre-empted. In another embodiment, if the application has asked to be informed whenever there is a change in the marker 16a-16n, then the application is informed either by a callback function or by sending a signal.

In another embodiment, if necessary, the change in the marker 16a-16n on one processor 31i can also result in a Multi-Processor Communication ("MPC") broadcast being sent, which results in all processors acknowledging their current instruction marker.

In one embodiment, the code-block 21a-21n is associated with a marker 16a-16n which has semantics associated with it. For example, all the code-blocks 21a-21n with marker A can be considered as code that modifies the core data structures in an application program, and hence, an audit log needs to be recorded whenever it is entered. In another embodiment, a code-block 21a-21n is a set of instructions that will be executed on the processor.

In view of the foregoing, having the ability to explicitly identify the semantics of the code-block can be very useful for putting the processor into different modes or to take different actions based on the semantics of a particular code-block. In other words, the system 10 addresses the problems and drawbacks caused by the lack of awareness of the semantics of the code being executed by a processor by associating each code-block a unique marker that helps to identify the semantics of that code-block, for example.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied therein.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system comprising:
a marker from a plurality of markers carried by a respective one of a plurality of code-blocks;
a processor configured to detect a change in the marker in an instruction stream, and configured to identify whether to notify an operating system when there is a change in the marker; and
a compiler/interpreter to determine the marker for each code-block and tag the code-block with the marker;
wherein the plurality of code-blocks comprise an instruction set to be executed on the processor;
wherein each of the plurality of code-blocks comprises at least one of a plurality of characteristics that define how the processor uses each of the plurality of code-blocks;
wherein the processor uses each of the markers to differentiate between each of the plurality of code-blocks and tracks control transfers between any of the plurality of code-blocks.

2. The system of claim 1 wherein a register is used by the processor to identify whether to notify the operating system or not when there is a change of markers in the instruction stream.

3. The system of claim 1 wherein the compiler/interpreter determines the markers to be assigned to a single program.

4. The system of claim 3 where the compiler/interpreter determines the marker to be given to each code-block based on the characteristics of that code-block.

5. The system of claim 4 wherein the characteristics include at least one of performance, security, and serviceability.

6. The system of claim 1 wherein the compiler/interpreter reassigns markers to the code-blocks based on the number of markers supported by the system's hardware.

7. The system of claim 1 wherein each of the markers is associated with at least one of a respective object file, or each function within the respective object file, and with a respective page-frame of code.

8. The system of claim 1 wherein the operating system notifies any interested party when at least one of a thread enters or leaves one of the plurality of code-blocks with a respective marker, and there is a respective marker change in the instruction stream.

9. A method comprising:
providing a marker to each of a plurality of code-blocks; and
identifying each of the markers, via a processor, to thereby improve at least one of security, maintainability, and performance of the plurality of code-blocks executed by that processor without changing any of the plurality of code-blocks;
wherein the plurality of code-blocks comprise an instruction set to be executed on the processor;
wherein each of the plurality of code-blocks comprises at least one of a plurality of characteristics that define how the processor uses each of the plurality of code-blocks;
wherein the processor uses each of the markers to differentiate between each of the plurality of code-blocks and tracks control transfers between any of the plurality of code-blocks.

10. The method of claim 9 further comprising associating each of the markers with at least one of a respective object file, and/or each function within the respective object file, and/or a respective page-frame of code via at least one of a compiler and an interpreter.

11. The method of claim 9 further comprises determining each of the markers' value via a loader.

12. The method of claim 9 further comprising assigning at least one of a plurality of characteristics to each of the plurality of code-blocks to define what the processor does before, during, and after executing each of the plurality of code-blocks.

13. The method of claim 9 further comprising using each of the markers to differentiate between each of the plurality of code-blocks and track control transfers between any of the plurality of code-blocks.

14. The method of claim 9 further comprising notifying, via an operating system, any interested party when at least one of a thread enters or leaves one of the plurality of code-blocks with a respective marker, and there is a respective marker change in an instruction stream.

15. A computer program product to improve system software or application software, the computer program product comprising:
a non-transitory computer readable storage medium having computer readable program code embodied therewith, the computer readable program code comprising:
computer readable program code configured to provide a marker from a plurality of markers to each one of a plurality of code-blocks; and
computer readable program code configured to identifying each of the markers, via a processor, to thereby improve at least one of security, maintainability, and performance of the plurality of code-blocks executed by a processor without changing any of the plurality of code-blocks;
wherein the plurality of code-blocks comprise an instruction set to be executed on the processor;
wherein each of the plurality of code-blocks comprises at least one of a plurality of characteristics that define how the processor uses each of the plurality of code-blocks;
wherein the processor uses each of the markers to differentiate between each of the plurality of code-blocks and tracks control transfers between any of the plurality of code-blocks.

16. The computer program product of claim 15 further comprising computer readable program code configured to associate each of the markers with at least one of a respective object file, or each function within the respective object file, and/or a respective page-frame of code.

17. The computer program product of claim 15 further comprising computer readable program code configured to assign at least one of a plurality of characteristics to each of the plurality of code-blocks to define what the processor does before, during and after the execution of each of the plurality of code-blocks.

18. The computer program product of claim 15 further comprising computer readable program code configured to use each of the markers via the processor to differentiate between each of the plurality of code-blocks and track control transfers between any of the plurality of code-blocks.

19. The computer program product of claim 15 further comprising computer readable program code configured to notify, via an operating system, any interested party when a specified thread enters or leaves one of the plurality of code-blocks with a respective marker, and there is a respective marker change in an instruction stream.

20. A system comprising:
 a processor;
 a plurality of code-blocks, and the plurality of code-blocks including an instruction set to be executed on the processor;
 a marker from a plurality of markers carried by each of the plurality of code-blocks; and
 wherein the processor is configured to identify each of the markers thereby improving at least one of security, maintainability, and performance of the plurality of code-blocks executed by that processor without changing any of the plurality of code-blocks;
 wherein the plurality of code-blocks comprise an instruction set to be executed on the processor;
 wherein each of the plurality of code-blocks comprises at least one of a plurality of characteristics that define how the processor uses each of the plurality of code-blocks;
 wherein the processor uses each of the markers to differentiate between each of the plurality of code-blocks and tracks control transfers between any of the plurality of code-blocks.

21. The system of claim 20 wherein the processor uses each of the markers to differentiate between each of the plurality of code-blocks and track control transfers between any of the plurality of code-blocks.

22. The system of claim 21 wherein the processor, upon identifying a change in the code-block marker of instructions it is executing, can notify all other processors running in a same operating system instance, so that all the processors running that operating system can take a predetermined action as a response to a change in the code-block marker in one processor.

23. The system of claim 20 wherein an operating system notifies any interested party when at least one thread enters or leaves one of the plurality of code-blocks with a respective marker, and there is a respective marker change in an instruction stream.

* * * * *